United States Patent
Louboutin

(10) Patent No.: US 10,099,648 B2
(45) Date of Patent: Oct. 16, 2018

(54) FILTER FOR A GAS GENERATOR

(71) Applicant: Autoliv Development AB, Vårgårda (SE)

(72) Inventor: Dominique Louboutin, Ergué-Gabéric (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/129,972

(22) PCT Filed: Mar. 23, 2015

(86) PCT No.: PCT/EP2015/056118
§ 371 (c)(1),
(2) Date: Sep. 28, 2016

(87) PCT Pub. No.: WO2015/144634
PCT Pub. Date: Oct. 1, 2015

(65) Prior Publication Data
US 2017/0136984 A1     May 18, 2017

(30) Foreign Application Priority Data
Mar. 28, 2014 (FR) ..................... 14 52711

(51) Int. Cl.
*B60R 21/26* (2011.01)
*B60R 21/264* (2006.01)

(52) U.S. Cl.
CPC . *B60R 21/2644* (2013.01); *B60R 2021/26011* (2013.01)

(58) Field of Classification Search
CPC ..................... B60R 21/2644; B60R 21/26011
See application file for complete search history.

(56) References Cited

U.S. PATENT DOCUMENTS

| | | | | |
|---|---|---|---|---|
| 5,556,130 A | * | 9/1996 | Fulmer | B60R 21/2644 102/530 |
| 6,183,006 B1 | * | 2/2001 | Katsuda | B60R 21/2644 280/736 |
| 6,196,581 B1 | | 3/2001 | Katsuda et al. | |
| 6,364,354 B1 | * | 4/2002 | Nakashima | B01D 46/2411 280/736 |
| 6,406,060 B1 | * | 6/2002 | Katsuda | B60R 21/2644 280/736 |

(Continued)

FOREIGN PATENT DOCUMENTS

| | | | |
|---|---|---|---|
| EP | 0800964 A2 | 10/1997 | |
| FR | 2865172 A1 | 7/2005 | |

OTHER PUBLICATIONS

International Search Report (French and English) for PCT/EP2015/056118, ISA/EP, Rijswijk, NL, dated Sep. 23, 2015.

(Continued)

*Primary Examiner* — Drew J Brown
(74) *Attorney, Agent, or Firm* — Stephen T. Olson; Harness, Dickey & Pierce, P.L.C.

(57) ABSTRACT

A filter for a pyrotechnical gas generator includes a filtering material and a protection screen. The protection screen forms at least one sealed loop arranged so as to surround at least a part of a charge of propergol of the pyrotechnical gas generator in such a manner as to protect this at least one part of the filtering material from a pressure wave from the ignition of the propergol charge.

19 Claims, 2 Drawing Sheets

(56) References Cited

U.S. PATENT DOCUMENTS

| | | | |
|---|---|---|---|
| 6,409,214 B2 | 6/2002 | Katsuda et al. | |
| 6,460,883 B1 * | 10/2002 | Nakashima | B01D 46/24 |
| | | | 280/736 |
| 6,695,345 B2 | 2/2004 | Katsuda et al. | |
| 7,665,764 B2 * | 2/2010 | Matsuda | B60R 21/2644 |
| | | | 280/736 |
| 7,823,919 B2 | 11/2010 | Jackson et al. | |
| 2007/0273132 A1 * | 11/2007 | Smith | B60R 21/2644 |
| | | | 280/736 |
| 2012/0247361 A1 | 10/2012 | Kobayashi et al. | |

OTHER PUBLICATIONS

Written Opinion of the ISA (French) for PCT/EP2015/056118, ISA/EP, Rijswijk, NL, dated Sep. 23, 2015.

* cited by examiner

FILTER FOR A GAS GENERATOR

CROSS-REFERENCE TO RELATED APPLICATIONS

This application is a 371 U.S. National Stage of International Application No. PCT/EP2015/056118, filed Mar. 23, 2015, which claims the benefit of and priority to French Patent Application No. 1452711, filed Mar. 28, 2014. The entire disclosures of the above applications are incorporated herein by reference.

FIELD

The present invention relates in a general manner to a filter for a gas generator and in particular a filter for a pyrotechnical gas generator to be mounted in a safety module for an automobile.

BACKGROUND

The filter according to the present invention is suitable for a pyrotechnical gas generator, that is, a gas generator comprising a charge of pyrotechnical propergol which will create the essential gases for the inflation of the associated airbag during its combustion.

Filters for such pyrotechnical gas generators such as the one disclosed in the document U.S. Pat. No. 7,823,919B2 are known in the prior art. The disclosed filter comprises a filtering material and is located arranged between a combustion chamber and discharge nozzles of the housing of the gas generator. On the other hand, this system has in particular a first disadvantage which consists of a risk of disturbing the flow of gas passing through the discharge nozzles if the filter is expanded or dilated during the igniting of the gas generator. In fact, a wave of strong and significant pressure is generated during the functioning of the igniter which can bring about a deformation or expansion of the filter which can lead to a partial obstruction of the discharge nozzles. This can also be produced during the ignition of the pyrotechnical material contained in the combustion chamber. The gas flow is then disturbed, which can bring about a different inflation speed than the one desired and therefore lead to a variability in the operation of the gas generator, a variability which results in an oversizing in particular of the generator walls (and therefore a charge) to be able to guarantee the safety of the generator conditions of operation.

A second disadvantage consists in that the filtering material of the filter in question can bring about a variability of the ignition because a part of the hot particles and hot gases ejected by the igniter in the charge of propergol can go directly into the filtering material. In this case these hot particles and hot gases are no longer in intimate contact with the propergol, which reduces the quality of the ignition and even more increases the variability of the functioning.

SUMMARY

A goal of the present invention is to respond to the disadvantages of the above-cited documents of the prior art and in particular to at first propose a filter with a filtering material which does not risk being deformed during the operation of the gas generator.

To this end a first aspect of the invention relates to a filter for a pyrotechnical gas generator comprising:
  a filtering material,
  a protection screen, characterized in that the protection screen forms at least a sealed loop arranged to surround at least a part of a charge of propergol of the pyrotechnical gas generator so as to protect this at least one part of the filtering material from a pressure wave from the ignition of the propergol charge. The filter according to the present implementation comprises a protection screen with a closed loop. The closed loop then receives the stresses imposed during the operation of the gas generator, and especially during the ignition phase, with the pressure wave generated by the ignition and/or the propergol, which begins to burn and generates a flow of gas which increases very rapidly. The closed loop can be, for example, a loop whose ends are welded, clinched or attached or locked to one another. It is also possible to envisage a cylinder of material for forming the protection screen; in fact, a tube resists well an internal stress (internal pressure, internal pressure wave, if the igniter is arranged in the inside.

The filtering material advantageously has a height and the protection covers at least a part of the filtering material situated at mid-height. In other words, the protection screen is arranged at least in the middle of the height of the filtering material, which allows the filtering material to be rigidified at the location where it is the most deformable. In fact, the protection screen adds its supplementary rigidity at the mid-height of the filtering material where it can flex and/or inflate most easily if it is held at its ends by the generator.

The filtering material is advantageously arranged at least in part around the protection screen, and the sealed loop is arranged in such a manner as to resist an expansion force greater than an expansion force of the filtering material. The protection screen forms a support frame for the filtering material. The latter can then be selected solely for its characteristics of filtration because the resistance of the filter (in particular to the pressure wave) is assured by the protection screen. In other words, when the filter is subjected to an internal pressure, the radial deformation of the filtering material is greater when the protection screen is not present then when it is present. Moreover, this implementation allows the avoidance of providing an outer support such as a hoop, for example, in order to avoid an expansion of the filtering material.

The protection screen is advantageously a support piece different from the filtering material. The realization of such a composite piece allows the optimization of the manufacture of each of the subcomponents with dedicated manufacturing machines.

The protection screen is advantageously a solid band. The protection is optimal because the protection screen acts as a barrier and does not allow flows (pressure, particles, gas) to pass toward the filtering material, which is preserved.

The solid band is advantageously free of holes over the length of the sealed loop.

The filtering material is advantageously attached to the sealed loop. It is possible to envisage welding the filtering material in order to attach it to the protection screen.

The filtering material advantageously has a cylindrical shape of a first height.

The protection screen advantageously protects the filtering material on a second height greater than or equal to one half of the first height. In other words, the protection screen covers the filtering material on at least one half of a surface which would be traversed by the combustion gases if the protection screen were not installed.

The pyrotechnical gas generator advantageously comprises an electro-pyrotechnical igniter with at least one radial vent arranged for igniting the propergol charge, and the protection screen is arranged facing this at least one radial vent. The protection screen is particularly useful according to this embodiment because, as previously stated, it protects the filtering material from a direct flow coming from the igniter (pressure wave, hot gases, hot particles) and furthermore it brings about a confinement of the hot gases and hot particles in the propergol charge, preventing them from going directly into the filtering material. The repeatability of the ignition is improved. It is also noted that the hot gases and hot particles are guided by the wall of the protection screen and will then be in contact with more of the propergol.

The protection screen advantageously comprises a solid band arranged facing this at least one radial vent.

The filtering material is advantageously a metallic wire and/or a metallic fabric and/or a metallic knit fabric and/or an unfolded metal.

A second aspect of the invention relates to a pyrotechnical gas generator comprising:
a combustion chamber,
a charge of propergol into the combustion chamber in order to create inflation gases for an airbag,
an electro-pyrotechnical igniter designed for igniting the propergol charge,
a filter comprising a filtering material and a protection screen,
characterized in that the protection screen forms at least one sealed loop arranged so as to surround at least a part of a charge of propergol of the pyrotechnical gas generator in such a manner as to protect this at least one part of the filtering material from a pressure wave from the ignition of the propergol charge.

The gas generator advantageously comprises at least one discharge nozzle and the protection screen is arranged between the igniter and the at least one discharge nozzle. It is noted that the risk of decapping the discharge nozzles by the pressure wave from the igniter is eliminated because the protection screen is between the igniter and the discharge nozzles. Therefore, the propergol can be correctly ignited and brings about a rise of normal pressure before the decapping. The risk of ill-timed deconfinement is reduced. In fact, a deconfinement (an opening of the discharge nozzles) which is too rapid can change the quality of the ignition while creating a lowering of the pressure in the combustion chamber when the propergol has not been correctly ignited. Furthermore, the screen also allows the length of the course of the hot gases generated by the combustion of the propergol through the filtering material to be enlarged, improving the efficiency of the filter because the hot gases cannot pass through the filter to the right of the nozzles (preferential zone because the course is shorter) but must travel around the protection screen.

The electro-pyrotechnical igniter advantageously comprises at least one radial vent and the protection screen is arranged facing this one radial vent.

The gas generator advantageously comprises at least one discharge nozzle and the filtering material is arranged between the propergol charge and the at least one discharge nozzle. This implementation allows the avoidance of providing an outer support such as a hoop, for example, in order to avoid an expansion of the filtering material, which leaves the zone free between the filtering material and the discharge nozzle.

A third aspect of the invention is a safety module comprising at least one gas generator according to the second aspect and/or at least one filter according to the first aspect.

A fourth aspect of the invention is an automobile comprising at least one gas generator according to the second aspect and/or at least one filter according to the first aspect.

BEST DESCRIPTION OF THE DRAWINGS

Other features and advantages of the present invention will appear more clearly from a reading of the detailed following description of three embodiments of the invention given in a non-limiting manner by way of example and illustrated by the attached drawings, in which.

DETAILED DESCRIPTION

Figure 1:
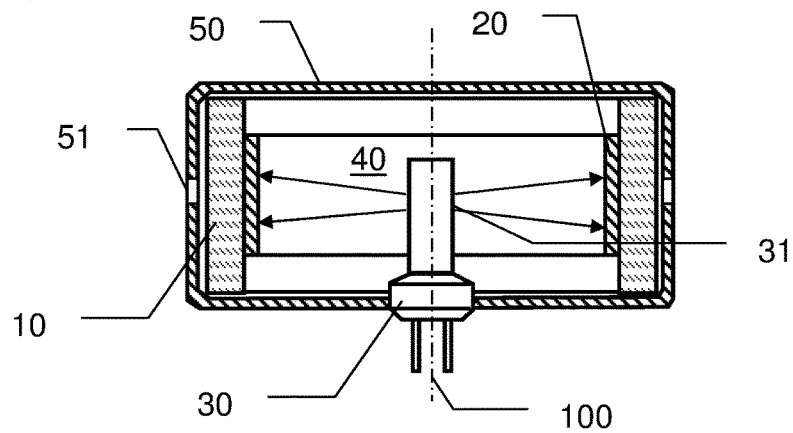
FIG. 1 shows a sectional view of a pyrotechnical gas generator comprising a filter according to the present invention.

FIG. 1 shows a pyrotechnical gas generator comprising a housing 50 in which a filter according to the present invention is arranged with a filtering material 10 and a protection screen 20. The filter surrounds a combustion chamber 40 which contains a propergol charge which is not shown for reasons of clarity. The propergol charge is typically a bulk charge of pellets. An igniter 30 is arranged in the center of the combustion chamber 40 with a case comprising two radial vents 31.

As the arrows show, the two radial vents 31 are arranged on a flank of the cylinder of the case of the igniter 30 in order to eject hot particles and hot gases in a direction radial to an axis 100 of the gas generator. These hot particles and hot gases are then directly found in the combustion chamber 40 and in the propergol charge located there.

This structure with such a radial igniter 30 avoids having to use a relay pyrotechnical charge between an igniter (axial, for example) and the propergol charge. The structure of the gas generator is simplified as well as its pyrotechnical change. The igniter 30 directly ignites the propergol charge without requiring a relay charge whose material and confinement receptacles would increase the total cost of the gas generator.

The protection screen 20 is advantageously arranged facing the radial vents 31 of the igniter 30 in such a manner as to protect the filtering material 10 from the pressure wave caused by the opening of the radial vents 31 as well as from the violent jet of hot gases and hot particles. Furthermore, the protection screen 20 protects the filtering material 10 during the ignition of the propergol charge. Therefore, the risk of an expansion of the filtering material 10 of the filter is reduced. The housing 50 comprises discharge nozzles 51 and the protection screen 20, by limiting the risk of expansion of the filtering material 10, prevents the latter from being obstructed even partially by the discharge nozzles 51.

Finally, the protection screen 20, by being arranged in such a manner facing the radial vents 31, prevents the hot particles and the hot gases ejected by the igniter 30 from going directly into the filtering material 10, which noticeably improves the repeatability of the ignition of the propergol. A partitioning of the combustion chamber 40 is obtained with the protection screen 20 which separates a charge space of propergol from a filtration space (the filtering material 10), which latter has an intrinsic dead volume prejudicial to the ignition.

Figure 2:
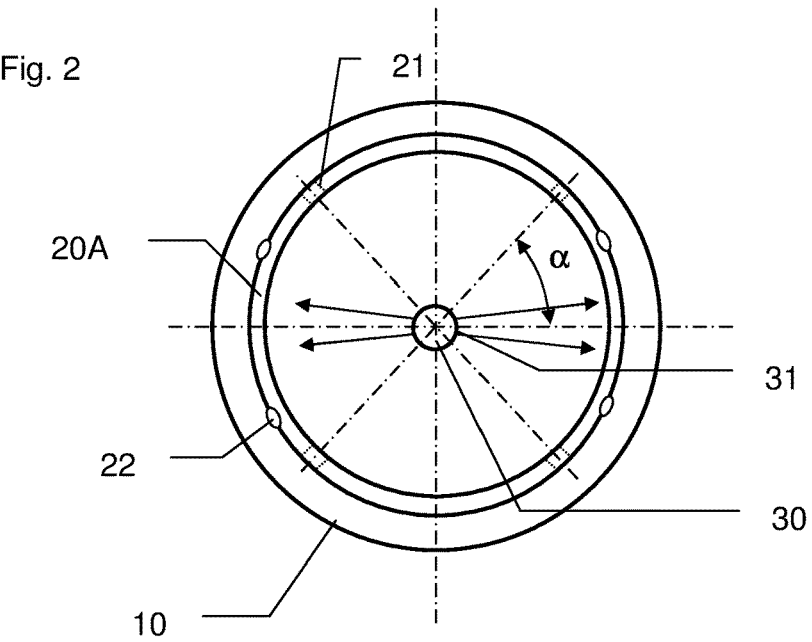
FIG. 2 shows a top view of a first variant of the filter of FIG. 1.

FIG. 2 shows a top view of a first variant of the filter of FIG. 1; Only the igniter 30 and the filter with the filtering material 10 and the protection screen 20A are shown. The igniter 30 still comprises two radial vents 31 which eject the hot particles and the hot gases, as is shown by the arrows.

The protection screen 20A here is a cylinder of solid sheeting comprising four passage orifices 21. In order to guarantee that the protection screen 20A effectively protects the filtering material 10 from the pressure wave generated by the igniter 30, the protection screen 20A is angularly oriented in such a manner that an angle α separates the passage orifices 21 from the direction of ejection defined by the radial vents 31. Therefore, the passage orifices 21 never face the radial vents 31, which is true whatever the number of orifices 21. The passage orifices 21 allow the gases stemming from the combustion of the propergol to be filtered by the zones of filtering material 10 which are traversed slightly or not at all by these gases without these passage orifices 21. This allows the general effectiveness of the filter to be increased.

Moreover, the filtering material 10 and the protection screen 20A are attached together by welding points 22. This implementation can be readily implemented industrially and brings about a good reliability of manufacture. Therefore, it is the protection screen 20A which receives the stresses generated by the pressure wave (stresses similar to an internal pressurisation of a tube) and effectively protects the filtering material 10 against an expansion or deformation.

Figure 3:
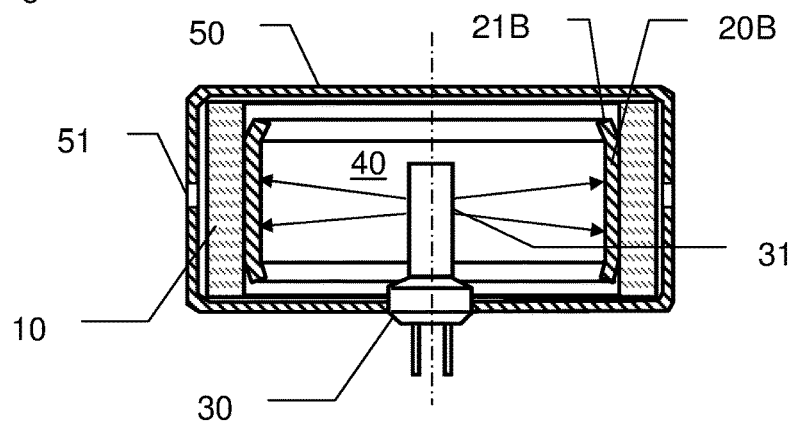
FIG. 3 shows a sectional view of a pyrotechnical gas generator comprising a filter according to a second variant of the filter of FIG. 1.

FIG. 3 shows a sectional view of a pyrotechnical gas generator comprising a filter according to a second variant of the filter of FIG. 1. The common elements of the two figures will not be described again. The difference from FIG. 1 resides in the definition of the filter and in particular in the definition of the protection screen 20B. Instead of being a cylinder as in FIG. 1, the protection screen 20B has ends 21B folded back toward the inside in order to obtain two distinct effects. On the one hand, these folded-back parts constitute ribs and rigidify the protection screen 20B in order to give it a better resistance against an ovalisation, for example. Then, either the thickness can be reduced in order to obtain the same resistance as a cylinder or the same thickness can be retained and improve the resistance.

On the other hand, this implementation improves the confinement during the ignition phase while redirecting the hot particles and the hot gases toward the interior of the combustion chamber 40 with the folded-back parts, which has the effect of improving the ignition of the propergol by the hot particles and the hot gases of the igniter.

Finally, this implementation allows the gases from the propergol to be directed to the central part of the filtering element 10, which improves the effectiveness of the filter.

Figure 4:
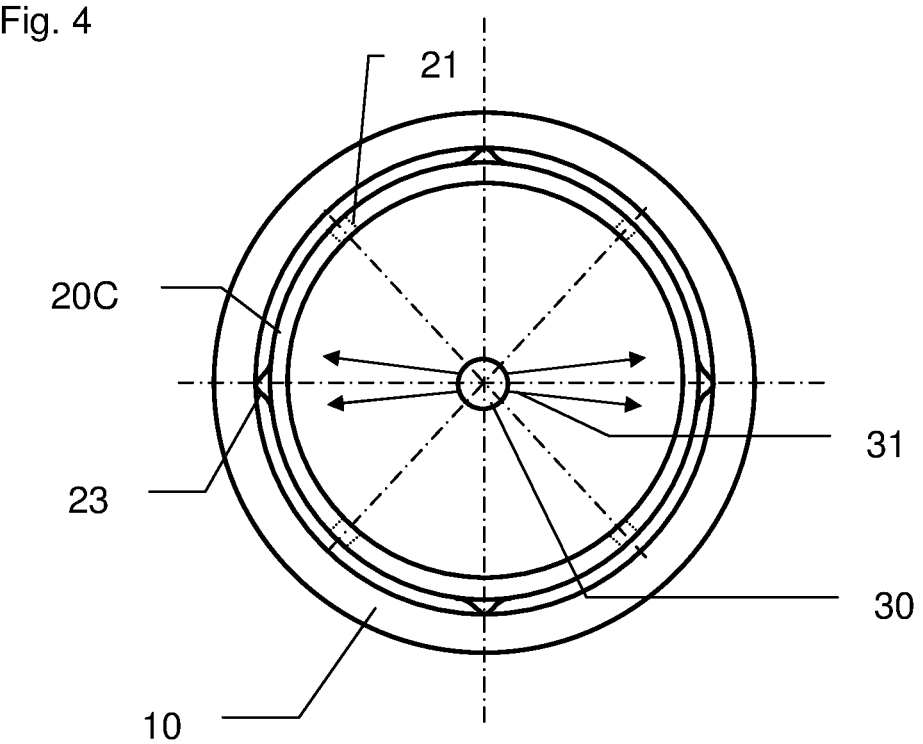
FIG. 4 shows a top view of a third variant of the filter of FIG. 1.

FIG. 4 shows a top view of a third variant of the filter of FIG. 1 and of the filter of FIG. 2. The common elements of the two figures will not be described again. The difference from FIG. 1 or 2 resides in the definition of the filter and in particular in the definition of the protection screen 20C. Instead of being a cylinder placed on the filtering material 10 as in FIG. 1 or 2, the protection screen 20C comprises protrusions 23 (or projecting parts). These protrusions 23 allow the protection screen to be centered in the filtering material in a punctiform and precise manner so as to create a supplementary passage for the combustion gases between the protection screen 20C and the filtering material 10, which improves the effectiveness of the filter.

Finally, it can be noted in the FIGS. 1 and 3 that the protection screen 20 or 20B covers respectively one half of the part of the filtering material 10. As the filter is in particular maintained at its two ends by the gas generator, the filtering material 10 can flex and inflate most easily at one half of the height during the operation of the gas generator (under the effect of the pressure wave of the igniter, then under the effect of the passage of the combustion gases through the filtering material 10). The holding of the filter at its two ends is assured by contact zones between the filter ends and the housing 50 during the operation of the generator. The contact zones prevent the radial movements of the filter ends toward the outside of the generator relative to the axis 100 of the generator. Since the filter cannot move at its ends and is protected in its middle by the protection screen, its deformations are limited and the space between the filter and the inside of the housing at the level of the discharge nozzles 51 is guaranteed. Therefore, the protection screen can be omitted in these zones. Moreover, the holding of the filter at its lower end, that is, in its part closest to the igniter, allows a good positioning of the filter to be assured during the assembly of the generator and in particular during the filling of the pyrotechnical material into the combustion chamber 40.

Arranging the protection screen at one half the filter height allows the flexing of the filtering material 10 to be limited, reducing the lever arm or the overhang relative to the ends held by the housing 50. The result is an optimum resistance of the filter during the operation and a lesser deformation. The risk of obturation of the nozzles 51 is then eliminated or reduced.

It is understood that various modifications and/or improvements obvious to a person skilled in the art can be added to the different embodiments of the invention described in the present description without leaving the scope of the invention defined by the attached claims.

The invention claimed is:

1. A pyrotechnical gas generator comprising:
   a housing;
   a combustion chamber in the housing;
   a filter including a filtering material; and
   a protection screen, the protection screen forms at least one sealed loop arranged to surround at least a part of a charge of the pyrotechnical gas generator in such a manner as to protect at least a part of the filtering material from a pressure wave from ignition of the charge
   wherein the filtering material has a height and the protection screen covers the filtering material at a midpoint of the height,
   wherein the filter has a first axial end adjacent a first end of the housing and a second axial end adjacent a second end of the housing such that the first and second axial ends of the filter are held to the housing at contact zones to maintain positioning of the filter within the housing, and
   wherein the protection screen is radially spaced from both the first end of the housing and the second end of the housing.

2. The pyrotechnical gas generator according to claim 1, wherein the filtering material is arranged at least in part around the protection screen, and that the sealed loop is arranged in such a manner as to resist an expansion force greater than an expansion force of the filtering material.

3. The pyrotechnical gas generator according to claim 1, wherein the protection screen is a support piece different from the filtering material.

4. The pyrotechnical gas generator according to claim 1, wherein the protection screen is a solid band.

5. The pyrotechnical gas generator according to claim 4, wherein the solid band is advantageously free of holes over a length of the sealed loop.

6. The pyrotechnical gas generator according to claim 1, wherein the filtering material is attached to the sealed loop.

7. The pyrotechnical gas generator according to claim 1, wherein the filtering material has a cylindrical shape with a first height, and that the protection screen protects the filtering material on a second height greater than or equal to one half of the first height.

8. The pyrotechnical gas generator according to claim 1, wherein the pyrotechnical gas generator comprises an electro-pyrotechnical igniter with at least one radial vent arranged for igniting the charge, the protection screen is arranged facing this at least one radial vent.

9. The pyrotechnical gas generator according to claim 1, wherein the filtering material is a metallic wire and/or a metallic fabric and/or a metallic knit fabric and/or an unfolded metal and/or a metallic, stamped sheet.

10. The pyrotechnical gas generator according to claim 1, in combination with a safety module.

11. The pyrotechnical gas generator according to claim 1, in combination with an automobile.

12. The pyrotechnic gas generator of claim 1, wherein a sidewall of the housing includes at least one vent and the protection screen is radially disposed between the igniter and the at least one vent.

13. A pyrotechnical gas generator comprising:
a housing;
a combustion chamber in the housing;
a charge in the combustion chamber for creating inflation gases for an airbag,
an igniter designed for igniting the charge, the igniter axially extending within the housing;
a filter comprising a filtering material and a protection screen, the protection screen forms at least one sealed loop arranged so as to surround at least a part of the charge in such a manner as to protect at least a part of the filtering material from a pressure wave from the ignition of the charge,
wherein the protection screen is radially positioned between the igniter and the filtering material, and
wherein the protection screen is radially spaced from both the first end of the housing and the second end of the housing.

14. The pyrotechnical gas generator according to claim 13, wherein the igniter comprises at least one radial vent, and that the protection screen comprises a solid band arranged facing this at least one vent.

15. The pyrotechnical gas generator according to claim 13, further comprising at least one discharge nozzle and that the filtering material is arranged between the charge and the at least one discharge nozzle.

16. The pyrotechnic gas generator of claim 13, in combination with a safety module.

17. The pyrotechnic gas generator of claim 13, in combination with an automobile.

18. The pyrotechnic gas generator of claim 13, wherein a sidewall of the housing includes at least one vent and the protection screen is radially disposed between the igniter and the at least one vent.

19. A pyrotechnical gas generator comprising:
a housing having a first axial end and a second axial end;
a combustion chamber within the housing;
a charge in the combustion chamber for creating inflation gases for an airbag,
an igniter for igniting the charge, the igniter axially extending in the housing;
a filter comprising a filtering material and a protection screen, the protection screen forms at least one sealed loop arranged so as to surround at least a part of a charge in such a manner as to protect at least a part of the filtering material from a pressure wave from the ignition of the charge, the protection screen radially positioned between the igniter and the filtering materials,
wherein a sidewall of the housing includes at least one vent and the protection screen is radially disposed between the igniter and the at least one vent, and
wherein the protection screen is radially spaced from both the first axial end of the housing and the second axial end of the housing.

* * * * *